United States Patent
Halsey (10) Patent No.: US 11,462,937 B2
(45) Date of Patent: Oct. 4, 2022

(54) METHOD AND APPARATUS FOR NO-BREAK POWER TRANSFER IN A POWER DISTRIBUTION SYSTEM

(71) Applicant: GE Aviation Systems Limited, Gloucestershire (GB)

(72) Inventor: Colin John Halsey, Cheltenham (GB)

(73) Assignee: GE Aviation Systems Limited, Gloucestershire (GB)

( * ) Notice: Subject to any disclaimer, the term of this patent is extended or adjusted under 35 U.S.C. 154(b) by 0 days.

(21) Appl. No.: 17/387,600

(22) Filed: Jul. 28, 2021

(65) Prior Publication Data

US 2021/0359539 A1 Nov. 18, 2021

Related U.S. Application Data

(62) Division of application No. 16/434,289, filed on Jun. 7, 2019, now Pat. No. 11,101,688.

(30) Foreign Application Priority Data

Jun. 15, 2018 (GB) .................................. 1809847

(51) Int. Cl.
- *H02J 9/00* (2006.01)
- *H02J 9/06* (2006.01)
- *B64D 31/00* (2006.01)

(52) U.S. Cl.
CPC .............. *H02J 9/062* (2013.01); *B64D 31/00* (2013.01); *B64D 2221/00* (2013.01)

(58) Field of Classification Search
CPC ...... H02J 9/062; B64D 31/00; B64D 2221/00
See application file for complete search history.

(56) References Cited

U.S. PATENT DOCUMENTS

| | | | |
|---|---|---|---|
| 4,937,462 A | 6/1990 | Recker | |
| 5,729,059 A | 3/1998 | Kilroy et al. | |
| 6,806,589 B1 | 10/2004 | Suttie | |
| 7,759,821 B2 | 7/2010 | Lando | |
| 8,159,086 B2 | 4/2012 | Karipides | |
| 8,760,004 B2 | 6/2014 | Weale | |
| 8,928,179 B2 | 1/2015 | Said | |
| 9,923,371 B1 | 3/2018 | Emert et al. | |
| 9,966,764 B2 | 5/2018 | Buffenbarger et al. | |
| 2002/0074863 A1* | 6/2002 | Turvey ................... | H02J 3/005 307/87 |
| 2005/0273206 A1* | 12/2005 | McGinley ............... | H02J 4/00 700/291 |
| 2008/0084118 A1 | 4/2008 | Lando et al. | |
| 2015/0035358 A1 | 2/2015 | Linkhart et al. | |
| 2017/0126018 A1 | 5/2017 | Buffenbarger | |

FOREIGN PATENT DOCUMENTS

| | | |
|---|---|---|
| EP | 2541723 A1 | 1/2013 |
| EP | 2727838 A2 | 5/2014 |
| GB | 2547706 A | 8/2017 |

* cited by examiner

*Primary Examiner* — Dinh T Le
(74) *Attorney, Agent, or Firm* — McGarry Bair PC (57) ABSTRACT

A method and apparatus for no-break power transfer in a power distribution system, including providing, from a first power source, a first power supply to a power bus, disabling the first power supply from the power bus, and providing, from a second power source, a second power supply to the power bus, the second power supply having the second set of electrical characteristics.

17 Claims, 6 Drawing Sheets

METHOD AND APPARATUS FOR NO-BREAK POWER TRANSFER IN A POWER DISTRIBUTION SYSTEM

CROSS REFERENCE TO RELATED APPLICATION(S)

This application is a divisional of U.S. application Ser. No. 16/434,289 filed, Jun. 7, 2019, now allowed, which claims priority to and benefit of Great Britain Patent Application No. 1809847.5 filed, Jun. 15, 2018, both of which are incorporated herein in their entirety.

BACKGROUND OF THE INVENTION

Electrical power distribution systems manage the allocation of power from energy sources to electrical loads that consume the distributed electrical power. In an aircraft, one or more turbine engines provide for propulsion of the aircraft, and can further provide mechanical energy to generate electricity that is supplied to a number of selectively interconnected power buses. The power buses can be selectively connected by way of contactors, and ultimately power a number of different accessories such as environmental control systems (ECS), in-flight entertainment systems, windshield deicing, galleys, fuel pumps, and hydraulic pumps, e.g., equipment for functions needed on an aircraft other than propulsion. For example, contemporary aircraft utilize electrical power for electrical loads related to avionics, motors, and other electric equipment.

DETAILED DESCRIPTION

Aspects of the present disclosure are described herein in the context of an aircraft, which enables production of electrical power from an energy source such as a turbine engine, jet fuel, hydrogen, etc. However, it will be understood that the disclosure is not so limited and has general applicability to power distribution systems in non-aircraft applications, including other mobile applications and non-mobile industrial, commercial, and residential applications. For example, applicable mobile environments can include an aircraft, spacecraft, space-launch vehicle, satellite, locomotive, automobile, etc. Commercial environments can include manufacturing facilities or power generation and distribution facilities or infrastructure.

While "a set of" various elements will be described, it will be understood that "a set" can include any number of the respective elements, including only one element. The use of the terms "proximal" or "proximally" refers to moving in a direction toward another component, or a component being relatively closer to the other as compared to another reference point. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. Additionally, while terms such as "voltage", "current", and "power" can be used herein, it will be evident to one skilled in the art that these terms can be interrelated when describing aspects of the electrical circuit, or circuit operations.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured, connected, or connectable to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus, or between buses.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

The exemplary drawings are for purposes of illustration only and the dimensions, positions, order and relative sizes reflected in the drawings attached hereto can vary.

Figure 1:
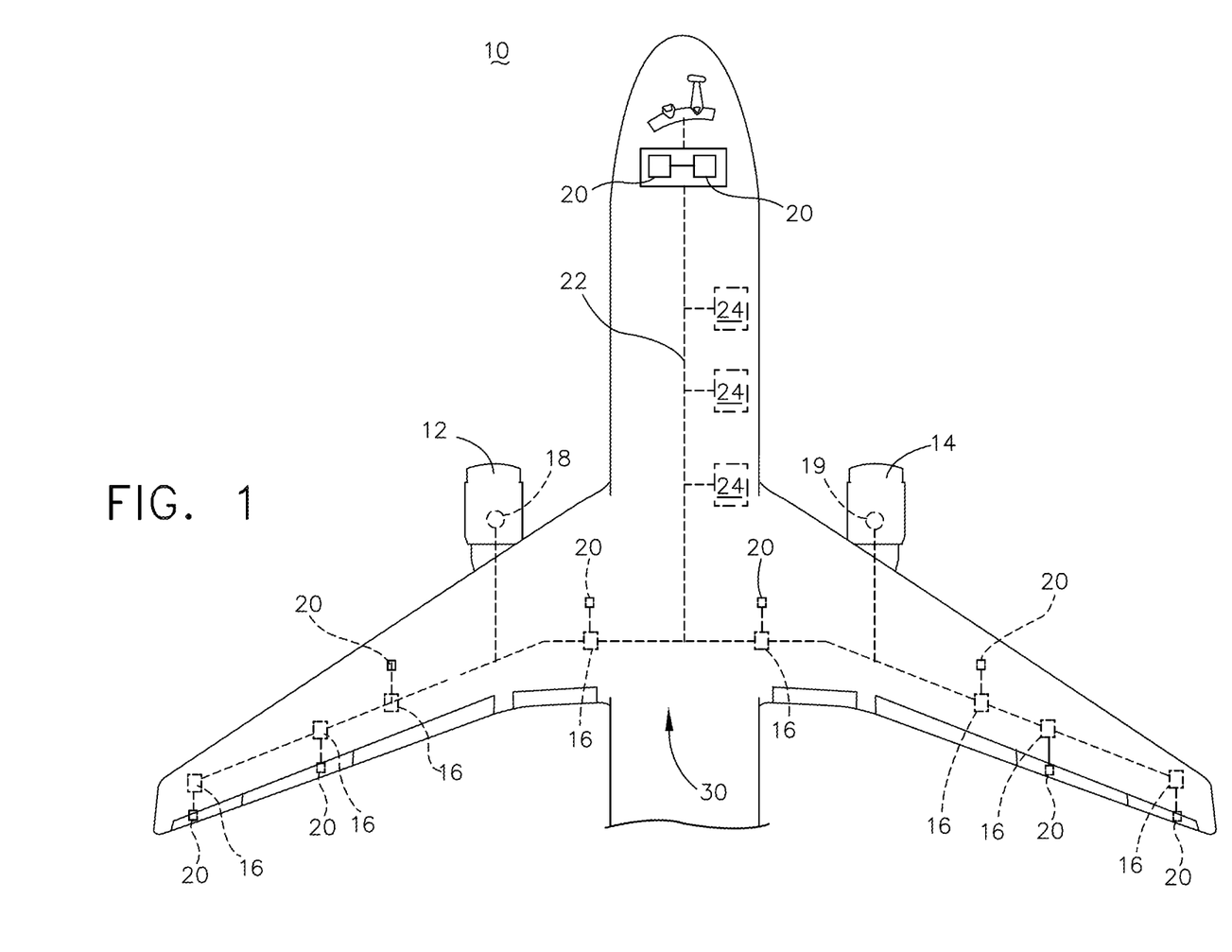
FIG. 1 is a top down schematic view of an aircraft and power distribution system of an aircraft, in accordance with various aspects described herein.

Referring now to FIG. 1, an aircraft 10 is shown having at least one turbine engine, shown as a left engine system 12 and a right engine system 14. Alternatively, the power system can have fewer or additional engine systems. The left and right engine systems 12, 14 can be substantially identical, and can further include at least one power source, illustrated respectively as a first generator 18 and a second generator 19. At least one of the first or second generators 18, 19 can include variable speed or variable output generators 18, 19. In this example, a variable speed or variable output generator 18, 19 can include a generator 18, 19 adapted or configured to operate within a predetermined range of input speed, gearbox speed ratios, or the like, and can generate a power output within a predetermined output range (e.g. voltage output range, current output range, frequency output range, or a combination thereof). In one non-limiting example, a variable output generator 18, 19 can include a generator adapted or configured to output approximately 115 Volts AC between 390 and 410 Hertz.

The left and right engine systems 12, 14 can further include another respective power source, such as a second electric machine or set of generators (not shown). Non-limiting aspects of the disclosure can be included wherein, for example, the left engine system 12 includes the first generator 18 as a primary power source and an additional generator as a secondary, back-up, or redundant power source. The aircraft is shown further having a set of power-consuming components, or electrical loads 20, such as for instance, an actuator load, flight critical loads, and non-flight critical loads.

The electrical loads 20 are electrically coupled with at least one of the generators 18, 19 via a power distribution system 30 including, for instance, power transmission lines 22, bus bars, power buses (or the like), and a set of power distribution nodes 16. The aircraft 10 can further include a set of supplemental power sources 24 selectably connectable with the transmission lines 22, and operable to provide at least a portion of primary power, supplemental power, redundant power, backup power, emergency power, or the like. Non-limiting examples of the supplemental power sources 24 can include, but are not limited to, generators, such as auxiliary or emergency power generators, solar panels, fuel cells, batteries, or any other source of electrical power. As shown, the set of supplemental power sources 24 can provide power to the set of transmission lines 22, and thus, the set of power distribution nodes 16 or the set of electrical loads 20.

In the aircraft 10, the operating left and right engine systems 12, 14 provide mechanical energy which can be extracted, typically via a spool, to provide a driving force for the set of generators 18, 19. The set of generators 18, 19, in turn, generate power, such as AC or DC power, and provides the generated power to the transmission lines 22, which delivers the power to the electrical loads 20, positioned throughout the aircraft 10. Furthermore, during operation, the set of supplemental power sources 24 can be selectably connected with the transmission lines 22, and operable to provide primary or supplemental power to a subset of the electrical loads 20.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. During emergency or inadequate periods of electrical power generation, including but not limited to engine or generator failure, at least one of the supplemental power sources 24 can be operated, enabled, or connected for providing power to the electrical loads 20. Additional management functions can be included.

It will be understood that while aspects of the disclosure are shown in an aircraft environment of FIG. 1, the disclosure is not so limited and can have applicability in a variety of environments. For example, while this description is directed toward a power system architecture in an aircraft, aspects of the disclosure can be further applicable to provide power, supplemental power, emergency power, essential power, or the like, in otherwise non-emergency operations, such as takeoff, landing, or cruise flight operations.

Furthermore, the number of, and placement of, the various components depicted in FIG. 1 are also non-limiting examples of aspects associated with the disclosure. For example, while various components have been illustrated with relative position of the aircraft 10 (e.g. the electrical loads 20 on the wings of the aircraft 10, etc.), aspects of the disclosure are not so limited, and the components are not so limited based on their schematic depictions. Additional aircraft 10 configurations are envisioned.

Figure 2:
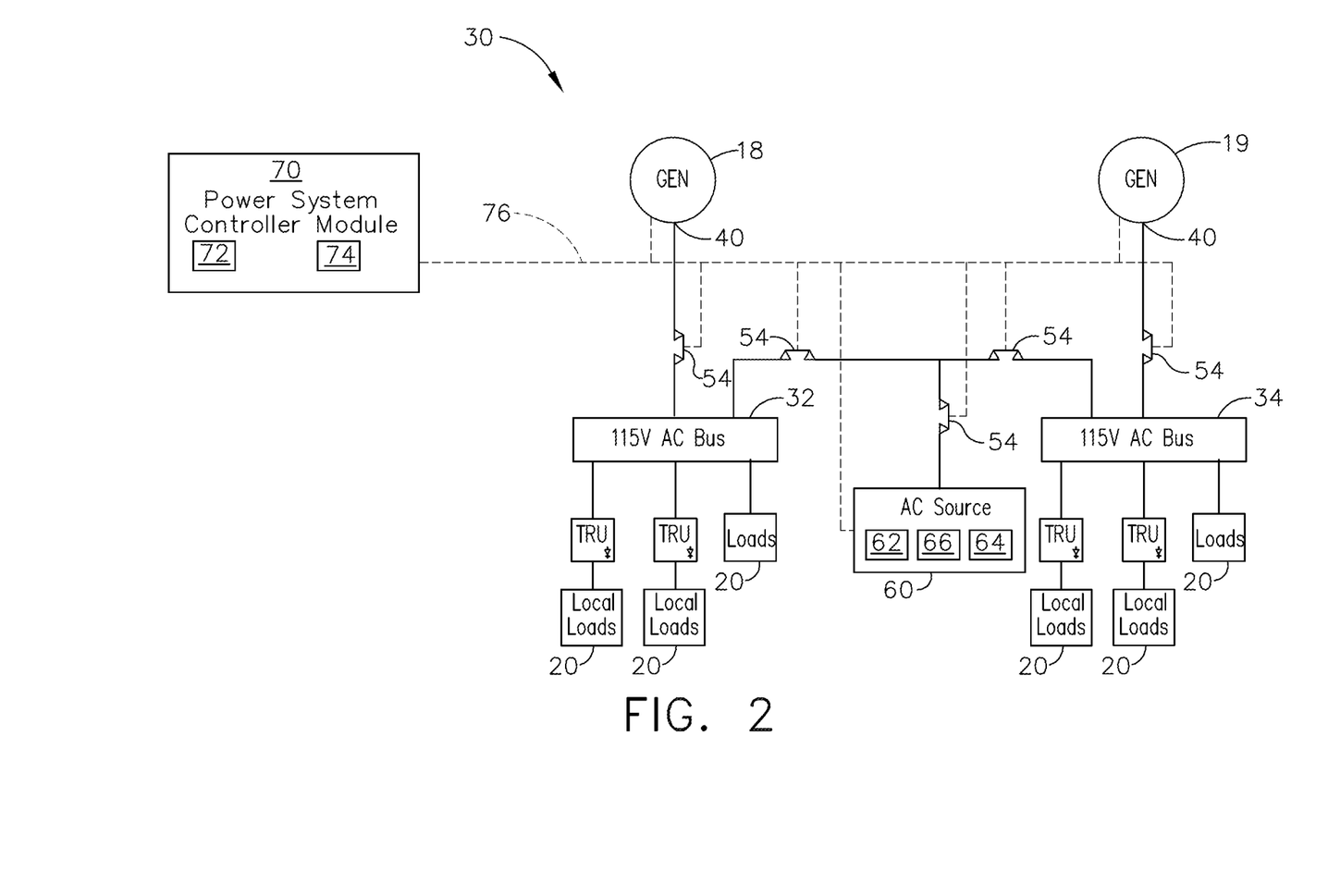
FIG. 2 is a schematic illustration of the power distribution system of the aircraft of FIG. 1, in accordance with various aspects described herein.

Referring now to FIG. 2, a schematic illustration is shown of an exemplary power distribution system 30 that can be utilized in the aircraft 10. The power distribution system 30 is shown having a set of power sources, such as of the first generator 18 and the second generator 19. While two generators 18, 19 are shown, aspects of the disclosure can include any number of generators 18, 19 or power sources, as desired. In addition, the set of generators 18, 19 can include a respective power output 40 for supplying power to various system components. While the set of generators 18, 19 are illustrated similarly, it is contemplated that the set of generators 18, 19 can supply or generate substantially similar electrical power output characteristics or varying electrical power output characteristics.

Each generator 18, 19 can be selectively connected via the power outputs 40 to a respective power bus of the power distribution system 30, shown as a first power bus 32 connectable with the first generator 18 and a second power bus 34 connectable with the second generator. A contactor 54 can be utilized between each generator 18, 19 and its respective power bus 32, 34 as a relay or switch to selectively connect the generator 18, 19 to the power bus 32, 34. As used herein, a contactor 54 can include a selectively controllable device adapted or configured to enable switching, connecting, or disconnecting between respective components. The set of power buses 32, 34 can further be connected with a corresponding set of electrical loads 20. In one non-limiting example, a subset of electrical loads 20 can be connected with a respective power bus 32, 34 by way of at least one transformer rectifier unit (TRU) 56. As used herein, a TRU 56 can be configured or adapted to convert or rectify the electrical power characteristics of the supplied power from the power bus 32, 34 to another, a different, an alternative, or an appropriate electrical power characteristic for a given electrical load 20. In non-limiting examples, the TRU 56 can provide voltage step-up or step-down power conversion, DC to AC power conversion, AC to DC power conversion, or AC to AC power conversion involving changes in frequency or phase. Addition, multiple power buses 32, 34 can be selectively connected or coupled together by way of contactors 54, for instance, to tie one power bus 32 with at least another power bus 34. In this instance, a power source or supply, such as the first generator 18, can selectively or operably supply power to the first power bus 32, which can be further shared, supplied, or supplemented with the second power bus 34, by way of the contactor 54.

The power distribution system 30 can also include at least one additional AC power source 60 that can be selectively connected to at least one power bus 32, 34, such as by way of a contactor 54. The AC power source 60 can include controller module elements, such as a processor 62 and memory 64, as well as a set of power storage units 66. Each power storage unit 66, or the set of power storage units 66 can include at least one DC power storage device, and associated circuitry, such as switching modules, to enable an AC voltage output of the DC power storage device. Non-limiting examples of the power storage unit 66 or power storage devices can include a dischargeable DC power storage device, such as a battery, a battery bank, a battery cell, a super capacitor, a fuel cell, a hydrogen cell, or a continuously or semi-continuous power conversion or supplying device, such as a solar cell, a wind turbine, or the like. The power storage unit 66 or the power storage device can also include a dischargeable or rechargeable power storage device.

In combination with the processor 62 and memory 64, aspects of the AC power source 60 can be adapted or configured to operably control the enabling of the set of power storage units 66 to provide a controllable power output of the AC power source 60. In another non-limiting example, the AC power source 60 can include one or more power sensors configured to sense a dischargeable power output of the AC power source 60, for example, to ensure a desired power output is being supplied.

The AC power source 60 can be configured or adapted to provide a controllable supply of electrical power to the respective power bus 32, 34. As described, the AC power source 60 can provide a "controllable" supply of electrical power, such that specific output characteristics of the AC power supply, including but not limited to voltage output range, current output range, frequency output range, phase, or a combination thereof, can be controlled, modified, adapted, or the like, to supply a predetermined, sensed, predicted, or target supply of electrical power. In this sense, the controllable supply of electrical power from the AC power source 60 can be dynamically altered, adjusted, changed, or modified, even as it is being supplied to the respective power bus 32, 34. Aspects of the disclosure can be included, however, wherein the total available, peak, or continuous power supply, wattage, or the like, of the AC source 60 can be different from the other power sources.

The power distribution system 30 can further include a power system controller module 70 having a processor 72 and memory 74. In this sense, the power system controller module 70 can be communicatively connected (for example, by way of communication lines 76) with each respective contactor 54, AC power source 60, generator 18, 19, or the like. In response to control signals or instruction signals generated by the power system controller module 70, the contactors 54 can selectively enable or disable electrical connections between respective components. Also in response to control signals or instruction signals generated by the power system controller module 70, the AC power sources 60 can selectively supply a predetermined or controllable AC power supply, such as by selective discharging of the set of power storage units 66, to a respective power bus 32, 34.

Figure 3:
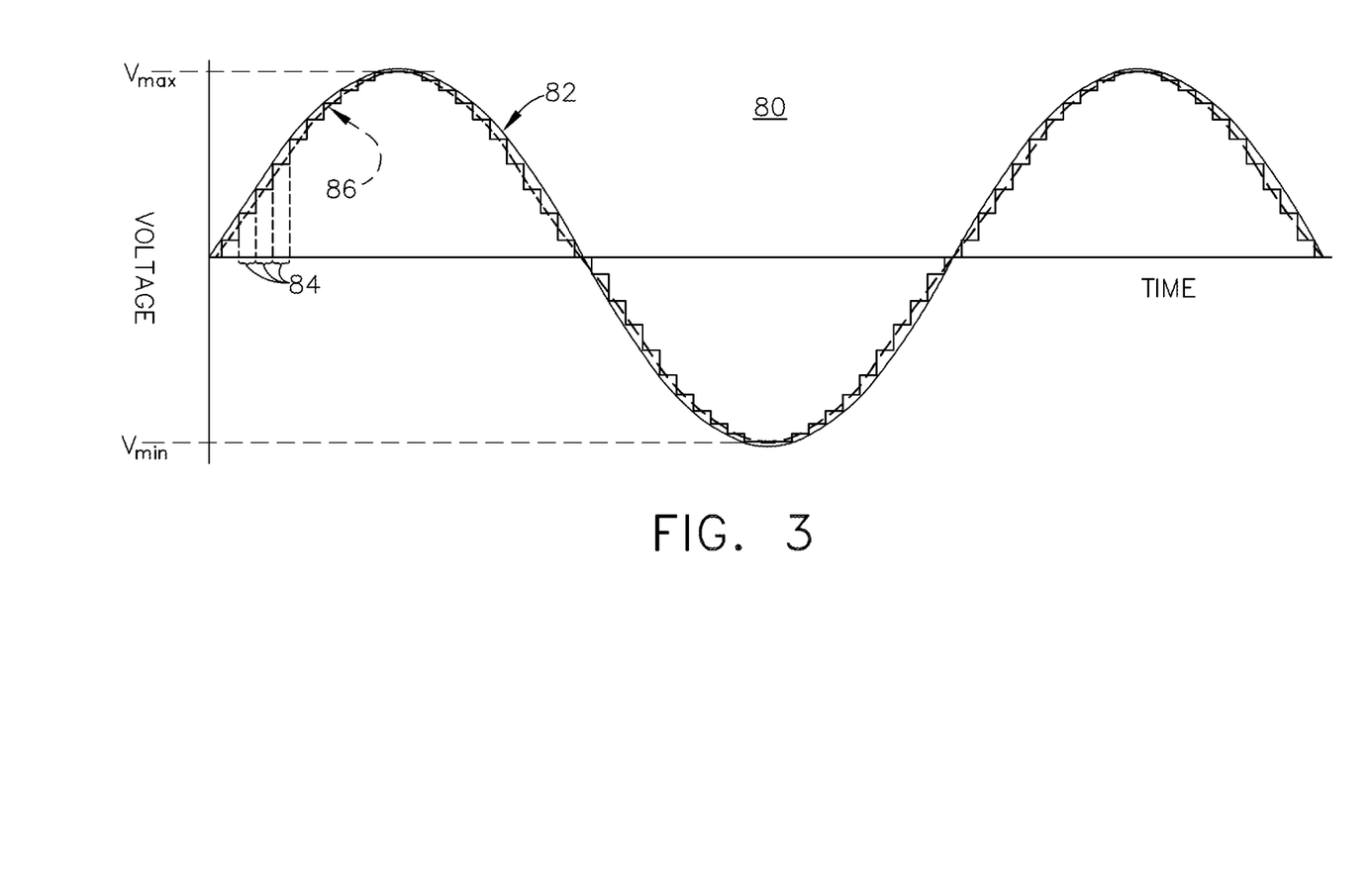
FIG. 3 is a schematic illustration of a voltage plot of an AC waveform of the AC power source of FIG. 2, in accordance with various aspects described herein.

FIG. 3 demonstrates one non-limiting example voltage plot 80 illustrating an ideal, desired, or target AC waveform output profile 82 for the AC power source 60. As shown, a controllably or sequenced enabling and disabling of power storage units 66 of the AC power source 60 (shown by stepped voltage outputs 84) can collectively represent a total AC power source output 86 over a positive and negative voltage waveform. In one example, a power filtering element can produce, average, or "smooth" out the AC power source output 86. In this sense, the controllable AC power source output 86 can emulate the AC waveform output profile 82. The controllable AC power source output 86 can further be controllably generated by way of the processor 62 of the AC power source 60 or in response to control signals or instruction signals from the power system controller module 70 to vary or modify the frequency, phase, timing, voltage output, or the like of the AC power source output 86, as needed. In one non-limiting example, the controllably AC power source output 86 can be controlled or controllable to match, correspond to, or align with an existing power supply, such as the first or second generator 18, 19, or another power supply of the power bus 32, 34.

Figure 4:
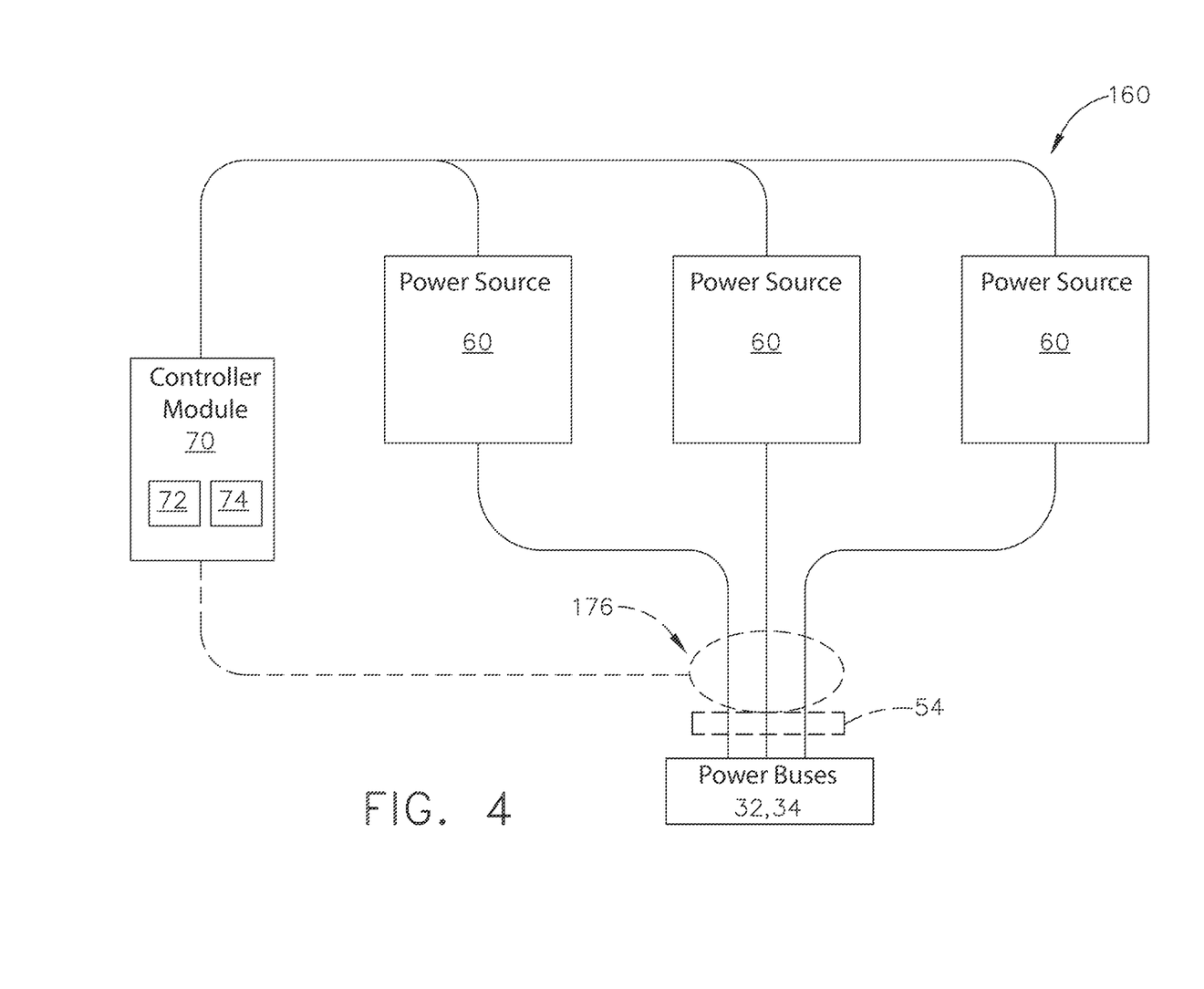
FIG. 4 illustrates a three-phase AC power source that can be utilized in the power distribution system of FIG. 2, in accordance with various aspects described herein.

FIG. 4 illustrates another AC power source system 160 that can be utilized in the power distribution system 30 of FIGS. 1 and 2. As shown, the AC power source system 160 can include a set of AC power sources 60 controllably and communicatively connected with the power system controller module 70, and having a set of outputs connected with the power bus 32, 34 by way of a contactor 54. In this sense, a set of single phase AC power source outputs 86 (as shown in FIG. 3) can be combined to provide a multi-phase AC power source system 160 output to the power bus 32, 34. In the illustrated example, three single phase AC power sources 60 can be controllably operated to supply a three-phase AC power source to the power bus 32, 34. While a three-phase AC power source system 160 is shown and described it will be understood that aspects of the disclosure can be included to grouped a set of AC power sources 60 into any number of phase-outputs, including, but not limited to, two-phase, four-phase, six-phase outputs, or the like.

In another non-limiting example of the disclosure, the AC power source system 160 is shown including a power sensor 176 adapted or configured to sense the power output of at least one of the AC power sources 60, as explained herein.

Aspects of the disclosure can provide for or enable a power distribution system 30 adapted to transfer power between selectively connected power buses 32, 34 or selectively connected power sources (e.g. the first and second generators 18, 19), by utilizing one or more AC power sources 60 or AC power source systems 160, as described herein.

During power generating operations, multiple power sources, such as multiple generators 18, 19, secondary generators, auxiliary power units (APUs), or the like, provide redundancy or alternative power sources that can supply power to one or more of the power buses 32, 34. In some instances, the multiple power sources are not synchronized in either phase or frequency. Thus, to provide power transfer between different power sources, the frequencies and phases (and sometimes the voltages) of the transferring power sources can be matched so the power sources can be temporarily connected in parallel with the power bus 32, 34 (e.g. "seamless" or "no-break" power transfer, where power is not interrupted to the power bus 32, 34). In this example, the different power sources can align or harmonize prior to energizing the power bus 32, 34. Alternatively, to provide power transfer between different power sources, the first power source can be disconnected from the power bus 32, 34 prior to the second power source being connected with the power bus 32, 34 (e.g. having a "break" power transfer where a continuous power supply is "broken"). In the example of the break power transfer, no harmonization between power sources is needed.

Referring back to FIG. 3, aspects of the disclosure can provide for or enable a "no-break" power transfer power distribution system 30 for a power bus 32, 34, such as the first power bus 32, from a first power source such as the first generator 18 to a second power source such as the second generator 19. The "no-break" power transfer can include utilizing at least one AC power source 60 to supply power to the first power bus 32 during a period of time where the first generator 18 is disconnected and before the second generator 19 is connected, and wherein the controllable power supply of the at least one AC power source 60 can be controllably modified or altered, while supplying the power, to vary between the power output characteristics (e.g. voltage output, current output, frequency output, phase, etc.) of the first generator 18 to the power output characteristics of the second generator 19. In this sense, the at least one AC power source 60 can "bridge" the power transfer between the first generator 18 and the second generator 19, wherein the first and second generators 18, 19 do not need to be harmonized, as described.

Figure 5:
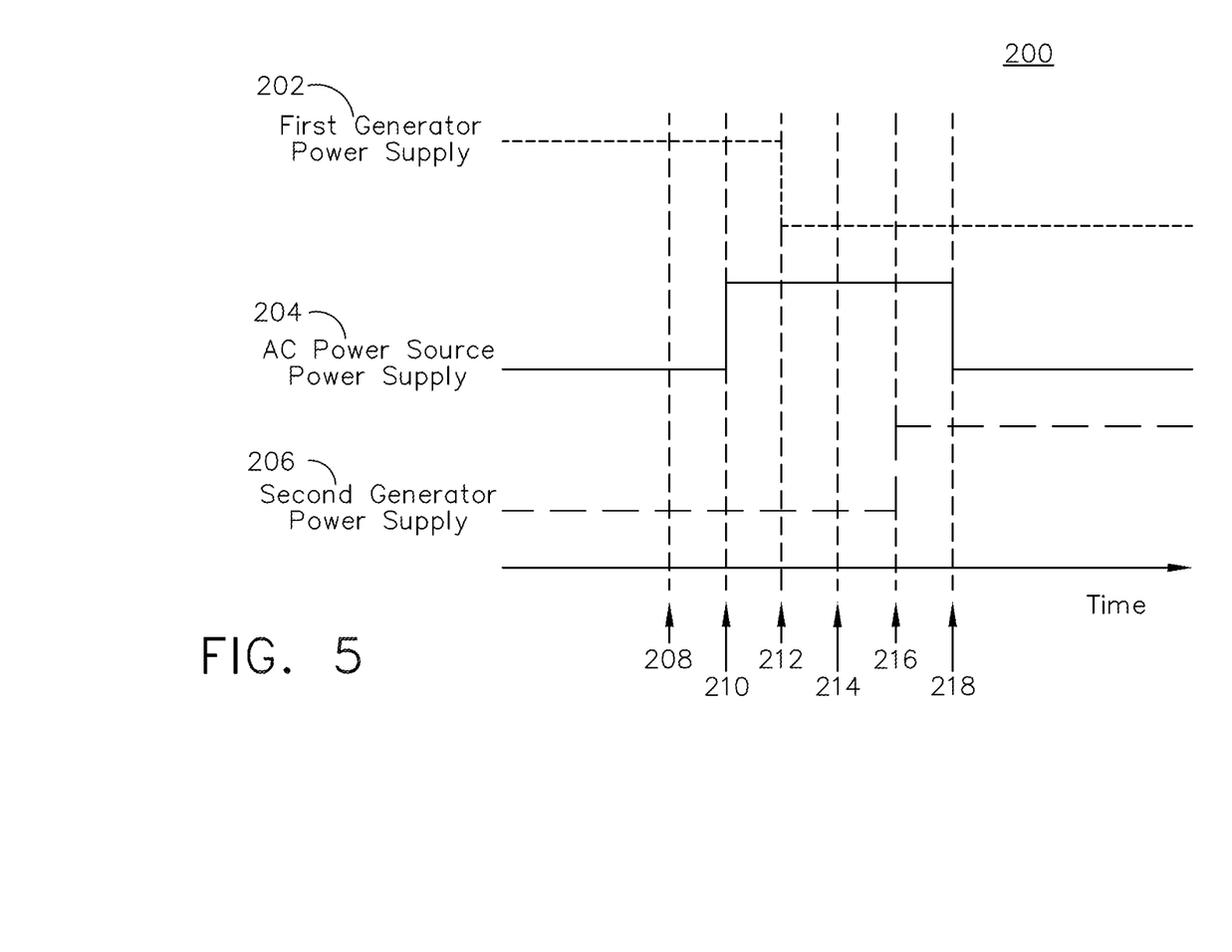
FIG. 5 is an example graph illustrating the supplying of power during a power transfer event of the power distribution system, in accordance with various aspects described herein.

FIG. 5 illustrates an example graph 200 illustrating the no-break power transfer of the power distribution system 30 over a period of time. The example graph 200 illustrates a representative binary indication of which power supplies are supplying power to, for example, the first power bus 32, over the period of no-break power transfer. As shown, a first signal 202 represents the supplying of power by the first generator 18, a second signal 204 represents the supplying of power by the AC power source 60, 160, and a third signal 206 represents the supplying of power by the second generator 29.

At a first time 208, prior to or at the initiation of the no-break power transfer operations, only the first generator 18 is supplying or providing power (e.g. the first signal 202 is "on") to the first power bus 32 at a set of first output characteristics. At the first time 208, the second signal 204 represents that the AC power source 60, 160 is not supplying power, and the third signal 206 represents that the second generator 19 is not supplying power (e.g. the second and third signals 204, 206 are "off"). In only non-limiting example, the first time 208 can indicate the moment in time when the power system controller module 70 indicates a request to transfer the power supply of the first power bus 32 from the first generator 18 to the second generator 19.

A second time 210 indicates that the AC power source 60, 160 begins supplying or providing power to the first power bus 32 (e.g. second signal 204 turns "on"), such that the first generator 18 and the AC power source 60, 160 are both supplying power, or co-supplying power to the first power bus 32. In one non limiting example, the AC power source 60, 160 can begin supplying power in response to a control or instruction signal received by the AC power source 60 from the power system controller module 70 to enable the generation of the AC power source output 86, as described herein. Additionally, at the second time 210, the power system controller module 70 can selectively instruct the contactor 54 between the AC power source 60, 160 and the first power bus 32 to selectively connect the components. In another non-limiting aspect of the disclosure, during a period of time between the first time 208 and the second time 210, the power system controller module 70 can be sensing, measuring, or otherwise communicating aspects of the first power output characteristics (i.e. power supply characteristics of the first generator 18 output or the first power bus 32), such as the voltage output, current output, frequency output, phase, etc., to the AC power source 60, 160. Thus, when AC power source 60, 160 is enabled, it can supply power in alignment with, harmonized with, or otherwise matching the first power output characteristics.

A third time 212 indicates that the first generator 18 stops supplying power or is disabled from supplying power to the first power bus 32 (e.g. the first signal 202 turns "off"). In one example, this can occur by way of the contactor 54 disconnecting the output 40 of the first generator 18 with the first power bus 32 in response to control or instruction signals provided or generated by the power system controller module 70. Following the third time 212, the AC power source 60, 160 is the only power source or power supply supplying power to the first power bus 32.

A fourth time 214 indicates an arbitrary time between the third time 212 and a fifth time 216, wherein, while the AC power source 60, 160 is solely supplying power to the first power bus 32, the power system controller module 70 can be sensing, measuring, or otherwise communicating aspects of a set of second power output characteristics of the second generator 19 output, such as the voltage output, current output, frequency output, phase, etc., to the AC power source 60, 160. During this time, the second generator 19 output 40 is not being supplied to the first power bus 32, but the AC power source 60, 160 begins to adjust or modify the controllable output being supplied to the first power bus 32 to be in alignment with, harmonized with, or otherwise matching the second power output characteristics. In the period of time between the fourth time 214 and the fifth time 216, the AC power source 60, 160 can controllably adjust of modify at least one of the voltage output, current output, frequency output, phase, or a combination thereof, such that the power supplied to the first power bus 32 by the AC power source 60, 160 between the fourth time 214 and the fifth time 216 is transitioning between a power output synchronized with the first generator 18 to a power output synchronized with the second generator 19. In only non-limiting example, the adjustment or modification of the controllable output of the AC power source 60, 160 can occur over a sequential series of small adjustments or modifications, including but not limited to delays, phase shifts, extending or shorting frequency periods, or the like. In one non-limiting example, controllably transitioning the controllable power supply can include first matching the phase of the second set of electrical characteristics followed by matching the frequency of the second set of electrical characteristics. By the fifth time 216, the AC power source 60, 160 has been synchronized with the second power output characteristics of the second generator 19.

During this period of time (between the fourth time 214 and the fifth time 216), the supplying of the controllable power output characteristics to the first power bus 32 does not cease, is not stopped, and does not interrupt the power demands of the first power bus 32. Stated another way, the power demands of the first power bus 32 or electrical loads 20 therewith are not interrupted, powered down, or operationally jeopardized. Additionally, the AC power source 60, 160 is sized to supply a sufficient amount of electrical power to operate the set of electrical loads 20 connected with the first power bus for at least the period of time to transition the controllable power output characteristics from matching the first power output characteristics to matching the second power output characteristics.

The fifth time 216 indicates that the second generator 19 begins or starts supplying or providing power to the first power bus 32 (e.g. the third signal 206 turns "on"), such that the AC power source 60, 160 and the second generator 19 are both supplying power, or co-supplying power to the first power bus 32. In one example, this can occur by way of the contactors 54 positioned between the first power bus 32 and the second power bus 34 connecting the output 40 of the second generator 19 with the first power bus 32 in response to control or instruction signals provided or generated by the power system controller module 70. Following the fifth time 216, the AC power source 60, 160 and the second generator 19 are supplying power in alignment with, harmonized with, or otherwise matching the second power output characteristics.

Finally, a sixth time 218 indicates that the AC power source 60, 160 stops supplying power to, or is disabled from supplying power to the first power bus 32 (e.g. the second signal 204 turns "off"). In one example, this can occur by way of the contactor 54 disconnecting the AC power source 60, 160 with the first power bus 32 in response to control or instruction signals provided or generated by the power system controller module 70. Following the sixth time 218, the second generator 19 is the only power source or power supply supplying power to the first power bus 32. At this time, the no-break power transfer of the power distribution system 30 has completed.

In one non-limiting example, the total period of time that the AC power source 60, 160 supplies power to the first power bus 32 (e.g. the period of time between the second time 210 and the sixth time 218) can be less than one second.

While aspects of the disclosure describe provide the example of the no-break power transfer for the first power bus 32, non-limiting aspects of the no-break power transfer are applicable for any power bus 32, 34, power distribution system 30, or the like.

Figure 6:
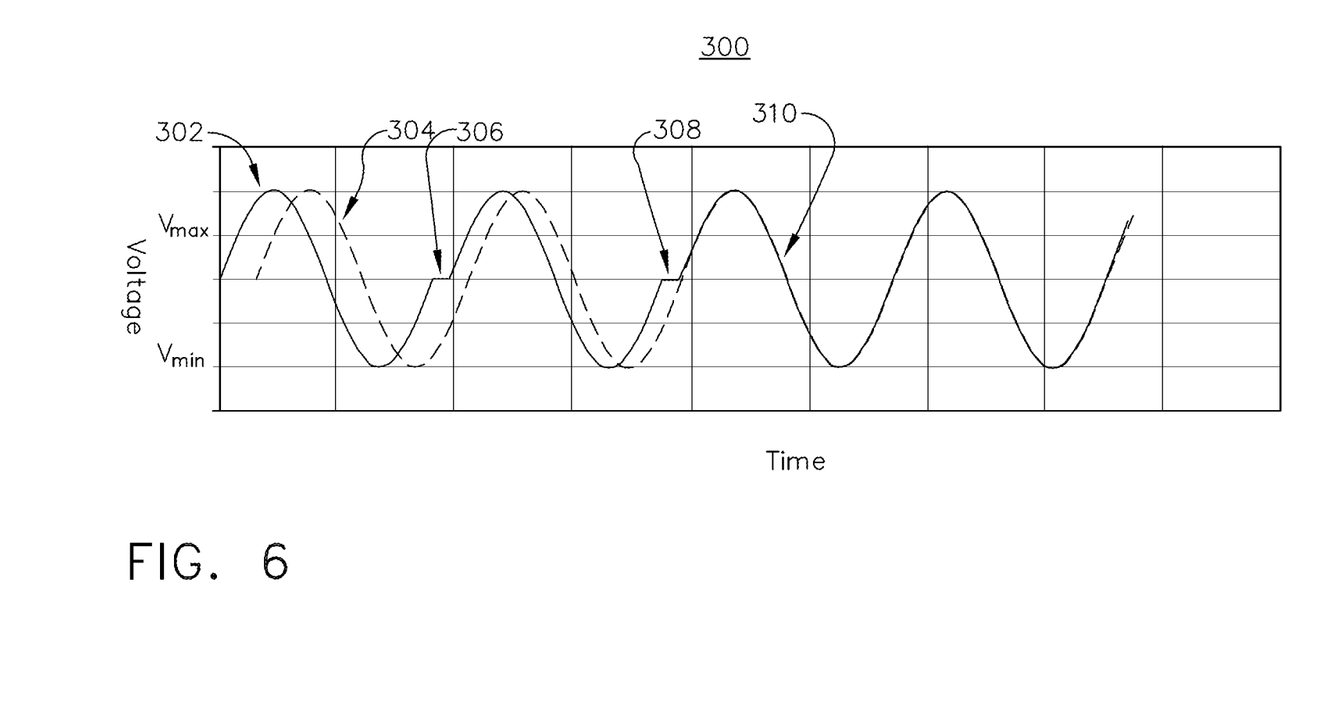
FIG. 6 is a schematic illustration of matching a controllable power output with another power output, in accordance with various aspects described herein.

FIG. 6 further illustrates and example graph 300 illustrating the adjusting or modifying of the controllable output of the AC power source 60, 160 between the fourth time 214 and the fifth time 216 of FIG. 5. The graph 300 illustrates a first AC waveform 302 illustrating the actual controllable output of the AC power source 60, 160 and a second AC waveform 304 of the second power output characteristics sensed or measured of the second generator 19. In one non-limiting example, the second AC waveform 304 can represent the actual sensed or measured second power output characteristics of the second generator 19 (for instance, as sensed by the power system controller module 70), or can represent the predicted or target supply of electrical power expected from the AC power source 60, 160, as described herein.

As shown, a series of small timing delays 306, 308 can be introduced over a number of sequentially successive power or waveform cycles until the first AC waveform 304 matches, harmonizes, or aligns with the second AC waveform 304 (e.g. shown in harmonized wave 310). In one non-limiting aspect of the disclosure, each of the small timing delays 306, 308 can be shorter than a power break or reset power break for the set of electrical loads 20 connected with the first power bus 32. In one non-limiting instance a "power break" or reset power break can include ceasing the supplying of power for longer than a power down or power reset period of time. In this sense, aspects of the disclosure include a "no-break" or "no-power-break" transfer of power.

The sequences depicted is for illustrative purposes only and are not meant to limit the aspects of the disclosure in any way, as it is understood that the portions of the disclosure of application thereof can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. For instance, aspects of the disclosure can apply to additional power transfer operations, including but not limited to, transferring power (e.g. on a power bus) between aircraft ground-based power supplies (e.g. a ground power cart or terminal power) to an auxiliary power unit, or to generator that has recently been started. Additionally, while aspects of the disclosure have been described as allowing or enabling power transfer capabilities between variable frequency generators, the disclosure can be utilized to allow or enable matching, harmonizing, or otherwise no-break power transfer capabilities between one or more variable frequency generators, one or more constant frequency generators, emergency power sources (e.g. ram air turbines), the like, or a combination thereof.

The aspects disclosed herein provide a method and apparatus for no-break power transfer between multiple power sources by utilizing a controllable AC power source. The technical effect is that the above described aspects enable the no-break power transfer between a first power source having first power supply characteristics and a second power source having second power supply characteristics, wherein the first and second power supply characteristics are dissimilar, by utilizing a controllable power output from the AC power source 60, 160 to bridge the first and second power supply characteristics over a number of cycles.

One advantage that can be realized in the above aspects is that the above described aspects allow or enable the use of dissimilar generators or power sources to operably supply power to electrical loads. In this sense, the electrical loads are not interrupted while adjusting or switching power sources, allowing seamless transmission of electrical power while changing power sources. Another advantage that can be realized in the above aspects is that the disclosure enables an AC power source, such as a bank of batteries or the like, to provide a sufficient supply of temporary power to fully support the electrical requirements of the power distribution system, without requiring additional sources. In this sense, the AC power source can provide for supplemental power, emergency power, or no-break transitional power, as needed or demanded by the power distribution system. Furthermore, by operating the AC power source as a transitional or bridge power source during operation of aspects of the disclosure, no power source being enabled or disabled requires any changes to the operation, operational characteristics, or control schema (e.g. the generator control unit) of the respective power source. Yet another advantage of the disclosure is that the AC power source can be retrofitted with power distribution systems without large modifications to enable the no-break power transfer To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. Further aspects of the invention are provided by the subject matter of the following clauses:

1. A power distribution system, comprising: a first power source having first power output characteristics; a second power source having second power output characteristics, wherein the second power output characteristics are different from the first power output characteristics; an alternating current (AC) power bus connectable with the first power source and the second power source; an AC power source configured to supply controllable power output characteristics to the AC power bus, the AC power source comprising a set of power storage units configured to supply direct current (DC) power; and a controller module communicatively connected with the AC power source, the first power source, and the second power source, and configured to transfer supplying power from the first power source to the AC power bus to supplying power from the second power source to the AC power bus by operably connecting the AC power source to supply the controllable power output characteristics matching the first power output characteristics, operably disconnecting the first power source from the AC power bus, operably transitioning the controllable power output characteristics from matching the first power output characteristics to matching the second power output characteristics without ceasing the supplying of the controllable power output characteristics to the AC power bus for longer than a power reset period of time, and connecting the second power source to the AC power bus.

2. The power distribution system of any preceding clause, wherein the controller module is further configured to sense at least one of the first power output characteristics from the first power source or the second power output characteristics from the second power source.

3. The power distribution system of any preceding clause, wherein the AC power source further comprises a set of power storage units configured to supply direct current (DC) power.

4. The power distribution system of any preceding clause, wherein the AC power source is configured to operably control an enabling of the set of power storage units to provide the controllable power output characteristics.

5. The power distribution system of any preceding clause, wherein the set of power storage units includes at least one of a battery, a battery bank, a battery cell, a super capacitor, a fuel cell, a hydrogen cell, a solar cell, or a wind turbine.

6. The power distribution system of any preceding clause, wherein the first power output characteristics and the second power output characteristics can include at least one of voltage output, frequency, or phase.

7. The power distribution system of any preceding clause, wherein the AC power source is configured to controllably modify at least one controllable power output characteristic consisting of at least one of voltage output, frequency, or phase.

8. The power distribution system of any preceding clause, wherein the AC power source is sized to supply a sufficient amount of electrical power to operate a set of electrical loads connected with the AC power bus for at least a period of time to transition the controllable power output characteristics from matching the first power output characteristics to matching the second power output characteristics.

9. The power distribution system of any preceding clause, wherein at least one of the first power source or the second power source is a variable frequency power source.

10. A method of operating a no-break power transfer for a power distribution system, the method comprising: providing, from a first power source, by way of a controller module, a first power supply to a power bus, the first power supply having a first set of electrical characteristics; providing, from an alternating current (AC) power source, by way of the controller module, a controllable power supply to the power bus by controllably discharging a set of direct current (DC) power storage units, the controllable power supply matching the first set of electrical characteristics; disabling, by way of the controller module, the first power supply from the power bus; controllably transitioning the controllable power supply of the AC power source from matching the first set of electrical characteristics to matching a second set of electrical characteristics, by way of the controller module, wherein controllably transitioning the controllable power supply includes matching a phase of the second set of electrical characteristics followed by matching a frequency of the second set of electrical characteristics, and wherein matching the frequency of the second set of electrical characteristics includes introducing a timing delay in a set of successive AC cycles of the controllable power supply until the controllable power supply is synchronized with the second set of electrical characteristics; and providing, from a second power source, by way of the controller module, a second power supply to the power bus, the second power supply having the second set of electrical characteristics.

11. The method of any preceding clause, further comprising disabling the controllable power supply from the power bus.

12. The method of any preceding clause, further comprising sensing, by a controller module, the first set of electrical characteristics from the first power supply prior to providing the controllable power supply to the power bus.

13. The method of any preceding clause, further comprising sensing, by a controller module, the second set of electrical characteristics from the second power supply prior to controllably transitioning the controllable power supply.

14. The method of any preceding clause, wherein disabling the first power supply, controllably transitioning the controllable power supply, and providing the second power supply occurs in less than one second.

15. The method of any preceding clause, wherein disabling the first power supply, controllably transitioning the controllable power supply, and providing the second power supply does not interrupt power demands of the power bus.

16. The method of any preceding clause, wherein the timing delay does not interrupt power demands of the power bus.

17. The method of any preceding clause, wherein providing the controllable power supply to the power bus further comprises controllably discharging a set of direct current (DC) power storage units.

What is claimed is:

1. A power distribution system, comprising:
a first power source having first power output characteristics;
a second power source having second power output characteristics, wherein the second power output characteristics are different from the first power output characteristics;
an alternating current (AC) power bus connectable with the first power source and the second power source;
an AC power source configured to supply controllable power output characteristics to the AC power bus, the AC power source comprising a set of power storage units configured to supply direct current (DC) power; and
a controller module communicatively connected with the AC power source, the first power source, and the second power source, andsonfigured to transfer supplying power from the first power source to the AC power bus to supplying power from the second power source to the AC power bus by operably connecting the AC power source to supply the controllable power output characteristics matching the first power output characteristics, operably disconnecting the first power source from the AC power bus, operably transitioning the controllable power output characteristics from matching the first power output characteristics to matching the second power output characteristics without ceasing the supplying of the controllable power output characteristics to the AC power bus for longer than a power reset period of time, and connecting the second power source to the AC power bus.

2. The power distribution system of claim 1, wherein the controller module is further configured to sense at least one of the first power output characteristics from the first power source or the second power output characteristics from the second power source.

3. The power distribution system of claim 1, wherein the AC power source further comprises a set of power storage units configured to supply direct current (DC) power.

4. The power distribution system of claim 3, wherein the AC power source is configured to operably control an enabling of the set of power storage units to provide the controllable power output characteristics.

5. The power distribution system of claim 3, wherein the set of power storage units includes at least one of a battery, a battery bank, a battery cell, a super capacitor, a fuel cell, a hydrogen cell, a solar cell, or a wind turbine.

6. The power distribution system of claim 1, wherein the first power output characteristics and the second power output characteristics can include at least one of voltage output, frequency, or phase.

7. The power distribution system of claim 1, wherein the AC power source is configured to controllably modify at least one controllable power output characteristic consisting of at least one of voltage output, frequency, or phase.

8. The power distribution system of claim 1, wherein the AC power source is sized to supply a sufficient amount of electrical power to operate a set of electrical loads connected with the AC power bus for at least a period of time to transition the controllable power output characteristics from matching the first power output characteristics to matching the second power output characteristics.

9. The power distribution system of claim 1, wherein at least one of the first power source or the second power source is a variable frequency power source.

10. A method of operating a no-break power transfer for a power distribution system, the method comprising:
providing, from a first power source, by way of a controller module, a first power supply to a power bus, the first power supply having a first set of electrical characteristics;
providing, from an alternating current (AC) power source, by way of the controller module, a controllable power supply to the power bus by controllably discharging a set of direct current (DC) power storage units, the controllable power supply matching the first set of electrical characteristics;
disabling, by way of the controller module, the first power supply from the power bus;
controllably transitioning the controllable power supply of the AC power source from matching the first set of electrical characteristics to matching a second set of electrical characteristics, by way of the controller module, wherein controllably transitioning the controllable power supply includes matching a phase of the second set of electrical characteristics followed by matching a frequency of the second set of electrical characteristics, and wherein matching the frequency of the second set of electrical characteristics includes introducing a timing delay in a set of successive AC cycles of the controllable power supply until the controllable power supply is synchronized with the second set of electrical characteristics; and
providing, from a second power source, by way of the controller module, a second power supply to the power bus, the second power supply having the second set of electrical characteristics.

11. The method of claim 10, further comprising disabling the controllable power supply from the power bus.

12. The method of claim 10, further comprising sensing, by a controller module, the first set of electrical characteristics from the first power supply prior to providing the controllable power supply to the power bus.

13. The method of claim 10, further comprising sensing, by a controller module, the second set of electrical characteristics from the second power supply prior to controllably transitioning the controllable power supply.

14. The method of claim 10, wherein disabling the first power supply, controllably transitioning the controllable power supply, and providing the second power supply occurs in less than one second.

15. The method of claim 10, wherein disabling the first power supply, controllably transitioning the controllable power supply, and providing the second power supply does not interrupt power demands of the power bus.

16. The method of claim 10, wherein the timing delay does not interrupt power demands of the power bus.

17. The method of claim 10, wherein providing the controllable power supply to the power bus further comprises controllably discharging a set of direct current (DC) power storage units.

* * * * *

UNITED STATES PATENT AND TRADEMARK OFFICE
CERTIFICATE OF CORRECTION

| | |
|---|---|
| PATENT NO. | : 11,462,937 B2 |
| APPLICATION NO. | : 17/387600 |
| DATED | : October 4, 2022 |
| INVENTOR(S) | : Colin John Halsey |

It is certified that error appears in the above-identified patent and that said Letters Patent is hereby corrected as shown below:

In the Claims

Column 13, Claim 1, Line 18 "...second power source, andsonfigured to transfer supplying..."
Should read "...second power source, and configured to transfer supplying..."

Signed and Sealed this
Twenty-eighth Day of March, 2023

Katherine Kelly Vidal
Director of the United States Patent and Trademark Office